United States Patent
Merrell

(10) Patent No.: US 6,588,143 B1
(45) Date of Patent: Jul. 8, 2003

(54) TOMATO CONE, GARDEN ACCESSORY

(76) Inventor: Elizabeth K. Merrell, 8804 S. 1595 East, Sandy, UT (US) 84093

( * ) Notice: Subject to any disclaimer, the term of this patent is extended or adjusted under 35 U.S.C. 154(b) by 0 days.

(21) Appl. No.: 10/086,969

(22) Filed: Mar. 4, 2002

(51) Int. Cl.$^7$ .............................................. A01G 13/02
(52) U.S. Cl. .......................... 47/20.1; 47/24.1; 47/29.1; 47/30; 47/2; 47/29.2; 47/29.3; 47/29.4
(58) Field of Search ................. 47/20.1, 21.1, 47/24.1, 29.1, 30, 2, 29.2, 29.3, 29.4, 31

(56) References Cited

U.S. PATENT DOCUMENTS

| | | | | |
|---|---|---|---|---|
| 355,282 A | * | 12/1886 | Sutton | |
| 592,640 A | * | 10/1897 | Orner | |
| 652,736 A | * | 6/1900 | Balsley | |
| 1,615,589 A | * | 1/1927 | Lewis | |
| 2,062,410 A | * | 12/1936 | Garcia | |
| 2,109,416 A | * | 2/1938 | King | |
| 2,141,484 A | * | 12/1938 | Piglia | |
| 4,348,831 A | * | 9/1982 | Chambers | 47/32 |
| 4,711,051 A | * | 12/1987 | Fujimoto | 47/17 |
| 5,222,325 A | * | 6/1993 | Angus | 47/30 |
| 5,345,711 A | * | 9/1994 | Friesner | 47/24 |
| 5,412,905 A | * | 5/1995 | Allison | 47/30 |
| 5,848,522 A | * | 12/1998 | Coviello | 56/329 |
| 6,067,747 A | * | 5/2000 | Reed | 47/28.1 |

FOREIGN PATENT DOCUMENTS

| | | | | |
|---|---|---|---|---|
| FR | 2621441 A1 | * | 4/1989 | A01G/13/04 |
| GB | 2216377 A | * | 10/1989 | A01G/13/00 |

* cited by examiner

Primary Examiner—Peter M. Poon
Assistant Examiner—Andrea M. Valenti

(57) ABSTRACT

A cone shaped, multi-use garden accessory, consisting of a single unit. The cone body is open at each end. The base, or larger end, is formed by a rounded rim. The neck, or smaller end, has a tubular extension with prongs affixed. Stiffeners are arrayed within the cone and extend through the tubular neck and along the prongs. The entire structure is composed of translucent, semi-rigid or rigid material.

4 Claims, 3 Drawing Sheets

TOMATO CONE, GARDEN ACCESSORY

BACKGROUND —FIELD OF INVENTION

This invention relates to the capping of garden plants in early Spring to protect against frost and the support of garden plants through the growing season until harvest, additionally providing protection of garden plants from garden pests.

BACKGROUND —DESCRIPTION OF PRIOR ART

Gardeners desire to plant tender vegetables early, to gain a maximum growing season. Early planting brings with it the treat of frost. Gardeners protect their plants against frost by capping them. Most prior art caps are comprised of wire reinforced, waxed paper cones or double walled, flexible sheets of plastic, water filled cones or double walled, solid plastic water filled cones. We will refer to these prior art caps as traditional caps.

The paper caps loose effectiveness because of their fragile construction, they are crushed by spring snows or heavy rains and are blown away by modest winds.

The flexible plastic walled, water filled caps are ineffective because they are difficult and time consuming to fill. They are precarious to set around the plant and are easily knocked over by wind, pets or gardener. They are difficult to clean and are easily damaged.

The solid plastic walled, water filled caps are heavy and cumbersome to place, they are difficult and time consuming to fill. They are bulky to store and to many, perhaps most, gardeners, cost prohibitive.

Gardeners desire to support their vegetables to keep the crop off the ground and for the ease of harvesting. Most prior art supports are composed of sticks and string or welded wire racks. These racks are either cone shaped with prongs pressed into the ground or hinged sheets placed in triangles or zig zag formation. We will refer to these prior art racks as traditional racks.

The traditional racks are ineffective because they require regular attention from the gardener, to keep the growing vegetation trained inside or supported from the rack. The traditional racks are difficult to clear from the garden at harvest time, due to the vegetation entwined in the rack. After disengaging the vegetation, the gardener is left with an increased and time consuming mess to clean up Gardeners desire to protect their vegetables from garden pests and find ways of economizing. Traditional caps and racks provide little or no protection from garden pests therefor fostering the over use of pesticides. Traditional caps and racks provide nothing to reduce the consumption of water and fertilizer.

OBJECTS AND ADVANTAGES

Several objects and advantages of the present invention are:
  (a) to provide a multi-purpose, single unit, garden accessory, serving as a vegetable cap and vegetable rack with garden pest protection capabilities.
  (b) to provide a garden accessory, vegetable cap which:
    (1) Is light weight easy to handle and rapidly deployed.
    (2) has a large stabilizing base resting on the ground and is easily bermed.
    (3) resists overturn from wind, pets and gardener.
    (4) protects against spring frost, snow, hail and heavy rain, without gardeners attention.
    (5) has opening at the top, allowing controlled ventilation.
  (c) to provide a garden accessory, vegetable rack which:
    (1) has prongs and tubular neck which fit around the plant and press into the ground then bermed.
    (2) has a vertical cone containing the plant, causing vertical growth, without gardeners attention.
    (3) has a broad rounded rim supporting vines laying over it undamaged, without gardeners attention.
    (4) allows a season of vine growth before touching the ground, without gardeners attention.
    (5) contains early crop within the cone and late season crop, hanging above the ground outside the cone.
    (6) is an inverted cone collecting water and fertilizer and funneling them to the roots, resulting in less water and fertilizer consumption
    (7) allows planting closer thereby using less garden space.
  (d) to provide a garden accessory with garden pest protection capabilities which:
    (1) has a tubular neck pressed into the ground around the plant, stopping burrowing pests like cut worms from approaching the plant.
    (2) has a tubular neck pressed into the ground. Apply snail bait only around the neck instead of the entire garden thereby reducing substantial the use of snail bait and surface pesticides.
    (3) has a rigid body, denying access of rabbits, quail and etc. to tender plants.
    (4) has a rounded rim for ease of attaching netting, denying air born insects to the cabbage family of plants.
  (e) to provide a light weight garden accessory which:
    (1) raises and contains plant in early season allowing ease of weeding and reduced herbicide use.
    (2) is an inverted cone when used as a rack and acts as a receptacle for fall clean up. Fold vines back into the cone then remove plant for disposal.
    (3) is a solid cone design, easily hose washed and stackable for compact storage.

DRAWING FIGURES

REFERENCE NUMERALS IN DRAWINGS

| | |
|---|---|
| (4) | interior stiffener |
| (5) | tubular neck |
| (6) | stabilizing prong |
| (7) | rounded rim |
| (8) | cone body |

Figure 1:
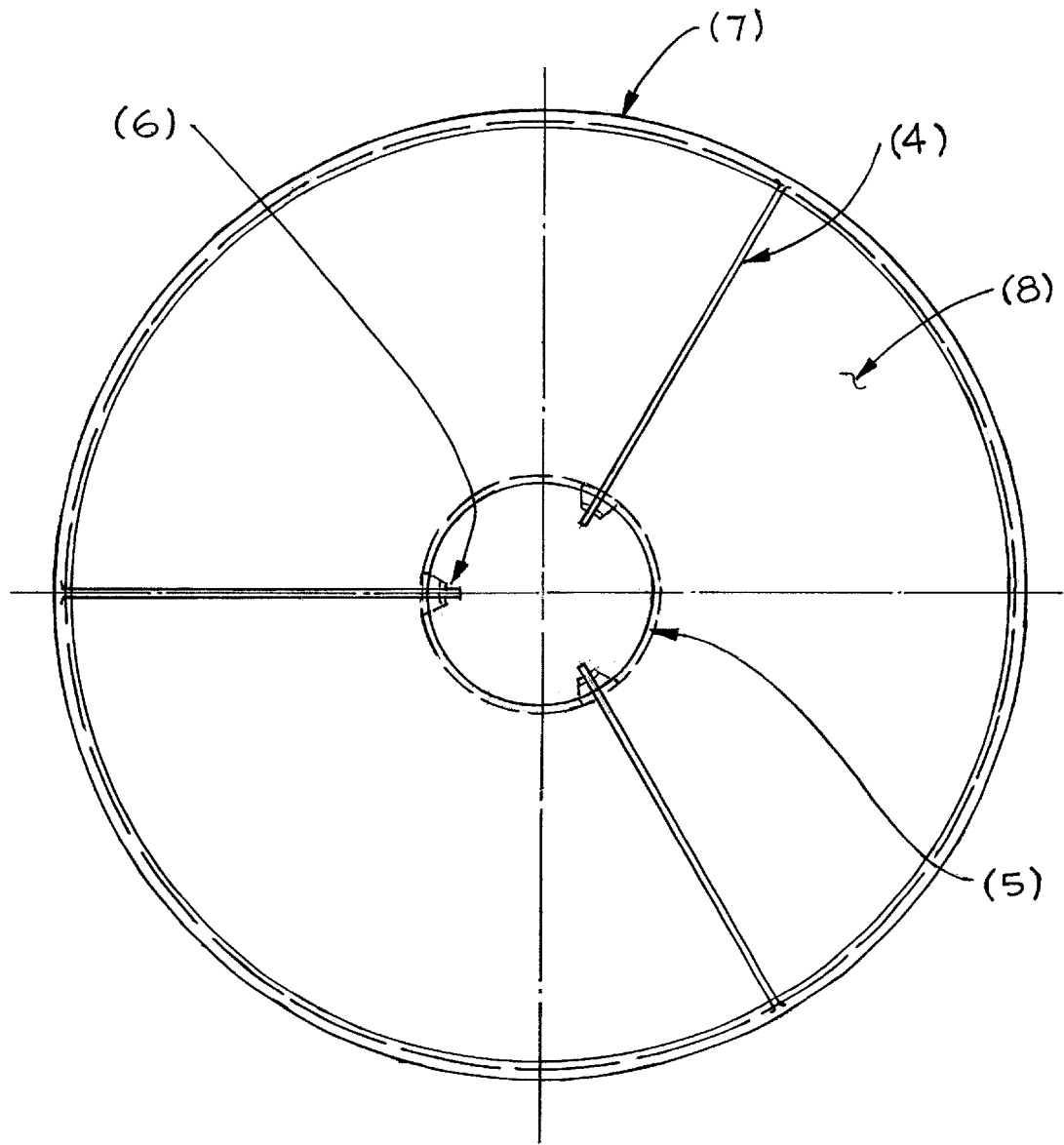
FIG. 1 shows a full scale plan view of the cone.
Figure 2:
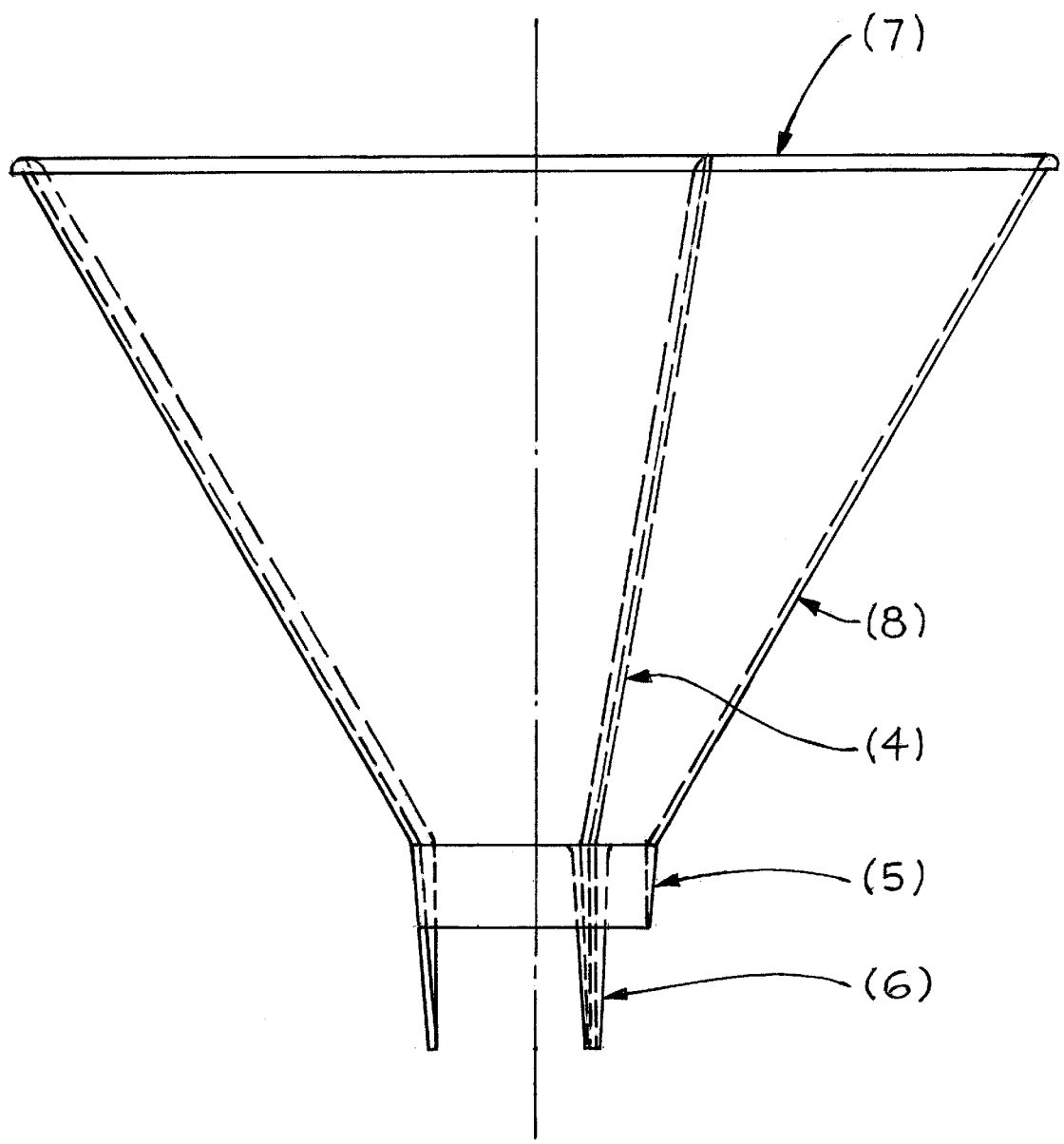
FIG. 2 shows an elevation view of the cone.
Figure 3:
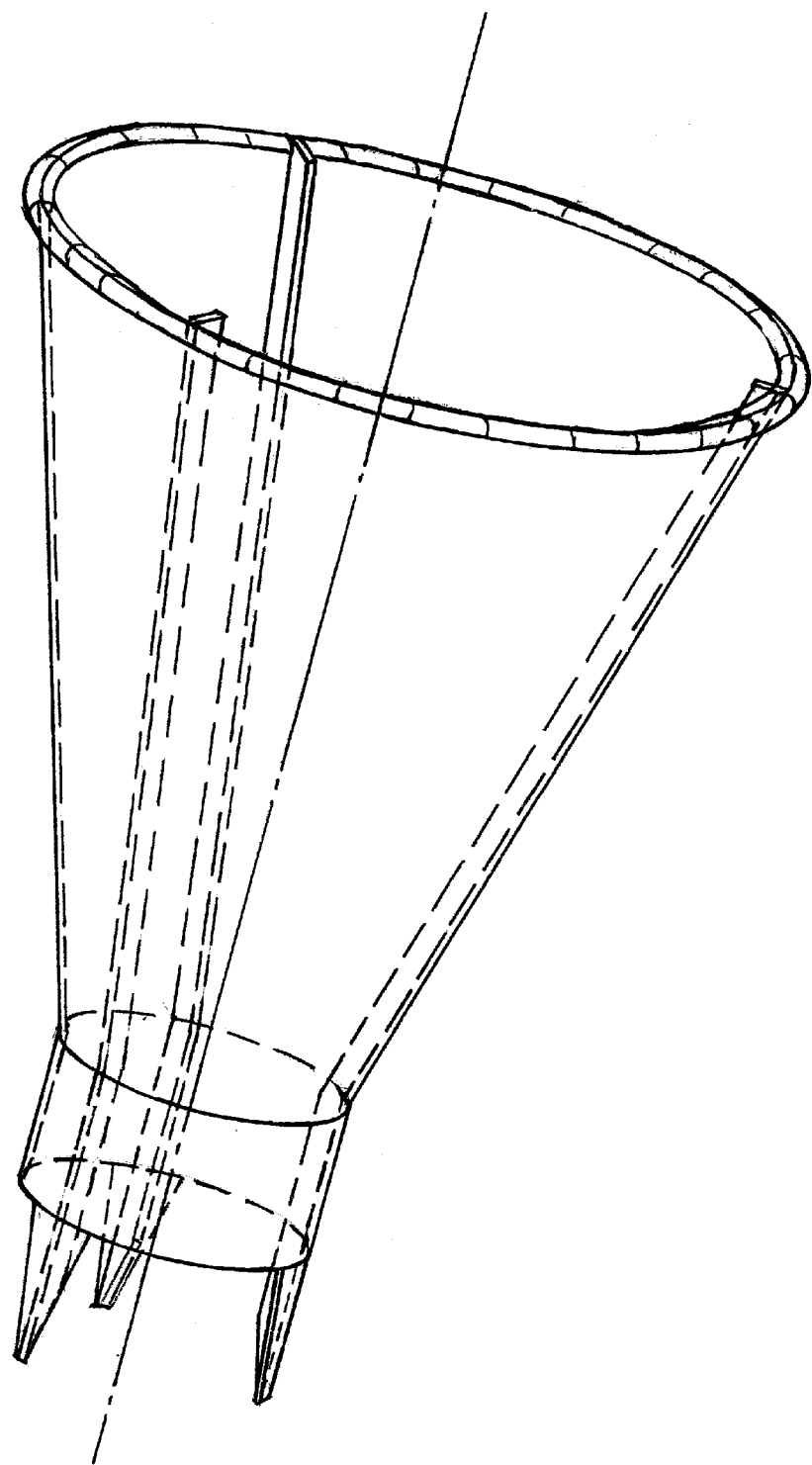
FIG. 3 shows a perspective view of the cone.

Description—FIGS. 1 to 3

A typical embodiment of the present invention is illustrated in FIG. 3 showing a perspective view of the unit, which is comprised of one part, a cone body (8), with four attributes, interior stiffeners (4), tubular neck (5), stabilizing prongs (6) and rounded rim (7).

The cone, FIGS. 1 and 2 is formed or injection molded and is composed of rigid or semi-rigid translucent plastic, such as but not limited to polyethelene, polypropelene, vynil, nylon, polystyrene or formed of a laminated fibrous material.

The cone, FIGS. 1 and 2 show a cone (8) with wall thickness of approximately 1/16". The cone (8) has two openings, the larger opening is approximately 18" diameter, referred to as (the base) has a rounded rim (7). The smaller opening is approximately 8" diameter, referred to as (the top) where is attached an 8" diameter by 3" long tubular neck(5). The cone (8) has running from opening to opening, interior stiffeners (4). The tubular neck (5) has a wall thickness of approximately 1/16" and has protruding from it, stabilizing prongs (6) which extend beyond the tubular neck (5) approximately 4".

Operation

The manner of using the present invention as a cap for garden vegetables is similar to traditional caps.

The gardener will plant in early spring, after the ground has thawed, he will place the tomato cone base upon the ground over the tender plant and berm around the base. The tubular neck (5) will be facing upward. The gardener may place cellophane or aluminum foil over the protruding stabilizing prongs (6) to control ventilation.

The gardener need not attend to the plant for the next 4 to 6 weeks until the threat of frost is gone.

The manner of using the present invention as a rack, differs from traditional racks.

The gardener removes the tomato cone which has been serving as a cap and turns it upside down. Holding the base upward, the gardener gathers the plant in one hand and slides the tubular neck(5) around the plant and presses the stabilizing prongs (6) and the tubular neck (5) into the ground and berms around it.

With the cone inverted, the base upward, it acts as a funnel, collecting water and fertilizer and delivering them directly to the roots. The inverted funnel stabilizes and forces the plant growth vertical without gardener attention.

The manner of using the present invention as pest protection is varied.

The gardener will be pleased to have his tender plant secure under the cap in early spring, where rabbits, birds and etc. can't get to it. The gardener will be pleased that when in the rack position, the tubular neck (5) protects the plant from burrowing insects and the gardener need only to apply insecticide around the small diameter of the neck area to control snails and crawling insects.

The gardener will be pleased to protect the cabbage family of plants against air born insects by securing netting over the inverted base, held in place with string or rubber band tucked behind the rounded rim (7).

The manner of using the present invention to clear the garden makes garden cleaning easier.

The gardener will be pleased that during the early growth season the plant is contained and raised above the ground allowing unobstructed weeding or the safe application of limited herbicide.

The gardener, after the harvest, folds the vines overgrowing the tomato cone, back into the inverted cone and simply lifts the entire plant from the ground. The plant is contained in the tomato cone and emptied into a waste receptacle, leaving very little mess in the garden. The gardener hoses down the tomato cone inside and out and stacks them until spring.

SUMMARY

Accordingly the reader will see that the tomato cone of this present invention is a multi-use garden accessory which can cap a plant more rapidly, securely and with less attention required than traditional caps. The tomato cone, as a rack is more stable and requires less attention than traditional racks. The tomato cone has pest protection capabilities which traditional caps and racks lack and it makes garden clean-up easier. The advantages of the tomato cone are:

1. It is a multi-use garden accessory.
2. It caps plants, protecting them from frost, snow, heavy rain, hail and garden pests.
3. It's large base provides stability, resisting overturn from wind pets and gardener.
4. It's light weight and solid form allows easy and rapid placement.
5. It allows for controlled ventilation.
6. It's prongs and berming results in a more stable rack.
7. It's inverted cone contains and causes vertical plant growth without gardeners attention
8. It has a broader rounded rim to support overhanging vines without gardeners attention.
9. It's inverted cone collects water and fertilizer, resulting in less consumption of both.
10. It allows closer planting, requiring less garden space.
11. It's tubular neck protect against burrowing insects.
12. It reduces garden area requiring soil treatment.
13. Its rigid body resists rabbits, quail and etc.
14. It's rounded rim accommodates easy application of netting.
15. It raises and protects plant for ease of weed control
16. It's cone shape acts a waste container for ease and hastening of garden clean up.
17. It is hose washable and stackable.

Although the description above contains many specificity's, these should not be construed as limiting the scope of the invention but as merely providing illustrations of some of the presently preferred embodiments of this invention.

Thus this scope of invention should be determined by the amended claims and their legal equivalents, rather than by the examples given.

I claim:

1. A single unit, multi-purpose plant protector which is a solid structure, slick sided, self-supported and self-operated, said structure being cone shaped open at each end, one end being a large base, the other end being a smaller neck whereby the structure is adapted to be placed, large base down, against the soil over the young plant thereby protecting it from early season frost.

2. A single unit multi-purpose plant protector of claim No. 1 wherein said inverted structure is slick sided, solid and of a radius whereby providing protection against gnawing pests such as squirrels, rabbits and rats while resisting climbing insects.

3. A single unit multi-purpose plant protector of claim No. 1 wherein said inverted structure is self-supported, flared with self relieving slick interior surface, whereby adapted as a waste receptacle for ease of garden clean-up.

4. A single unit multi-purpose plant protector of claim No. 1 wherein said structure
   is composed of transluscent plastic, manufactured by means of injection or rotational molding.

* * * * *